US009827947B2

(12) United States Patent
Jaradi et al.

(10) Patent No.: US 9,827,947 B2
(45) Date of Patent: Nov. 28, 2017

(54) LOAD LIMITING SEAT BELT BUCKLE ASSEMBLIES

(71) Applicant: FORD GLOBAL TECHNOLOGIES, LLC, Dearborn, MI (US)

(72) Inventors: Dean M. Jaradi, Macomb, MI (US); S. M. Iskander Farooq, Novi, MI (US); Mohammed Shenaq, Dearborn, MI (US); Mohammed Omar Faruque, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/040,071

(22) Filed: Feb. 10, 2016

(65) Prior Publication Data
US 2017/0225649 A1   Aug. 10, 2017

(51) Int. Cl.
*B60R 22/28* (2006.01)
*B60R 22/12* (2006.01)
*B60R 22/18* (2006.01)

(52) U.S. Cl.
CPC .............. *B60R 22/28* (2013.01); *B60R 22/12* (2013.01); *B60R 22/18* (2013.01); *B60R 2022/1806* (2013.01); *B60R 2022/286* (2013.01)

(58) Field of Classification Search
CPC ......... B60R 22/12; B60R 22/18; B60R 22/28; B60R 2022/286; B60R 2022/1806
See application file for complete search history.

(56) References Cited

U.S. PATENT DOCUMENTS

| 4,886,296 | A |   | 12/1989 | Brodmann |
| 5,152,552 | A |   | 10/1992 | Ikegaya |
| 5,211,694 | A |   | 5/1993 | Sakakida et al. |
| 5,213,365 | A |   | 5/1993 | Foehl |
| 5,236,220 | A | * | 8/1993 | Mills ....................... B60R 22/22 280/801.1 |
| 5,634,690 | A |   | 6/1997 | Watanabe et al. |
| 5,782,492 | A |   | 7/1998 | Ojima et al. |
| 5,873,599 | A | * | 2/1999 | Bauer ................. B60R 22/1952 180/273 |
| 6,056,320 | A |   | 5/2000 | Khalifa et al. |
| 6,099,078 | A |   | 8/2000 | Smithson et al. |

(Continued)

FOREIGN PATENT DOCUMENTS

FR    1542968 A    10/1967
FR    3018247 A1    9/2015
(Continued)

OTHER PUBLICATIONS

GB Search Report dated Jul. 19, 2017 for related GB Application No. GB1702102.3.

*Primary Examiner* — Faye M Fleming
(74) *Attorney, Agent, or Firm* — Frank A. MacKenzie; Brooks Kushman P.C.

(57) ABSTRACT

A seat belt buckle assembly includes a buckle housing; a plate extending from the buckle housing and defining a slot; and a bracket including a rivet engaged in the slot. The plate and rivet are configured such that, in response to an impact force that exceeds a threshold acting to pull the buckle housing away from the bracket, the slot plastically deforms, permitting the buckle housing and plate to translate relative to the bracket.

13 Claims, 7 Drawing Sheets

(56) References Cited

U.S. PATENT DOCUMENTS

| | | | |
|---|---|---|---|
| 6,913,288 B2 * | 7/2005 | Schulz | B60R 22/28 |
| | | | 188/371 |
| 8,641,096 B1 | 2/2014 | Kohlndorfer | |
| 2011/0133439 A1 | 6/2011 | Pearce | |
| 2016/0257284 A1 * | 9/2016 | Farooq | B60R 22/28 |

FOREIGN PATENT DOCUMENTS

| | | | | |
|---|---|---|---|---|
| JP | 02164642 A | * | 6/1990 | B60R 22/18 |
| JP | 2013018460 A | | 1/2013 | |

* cited by examiner

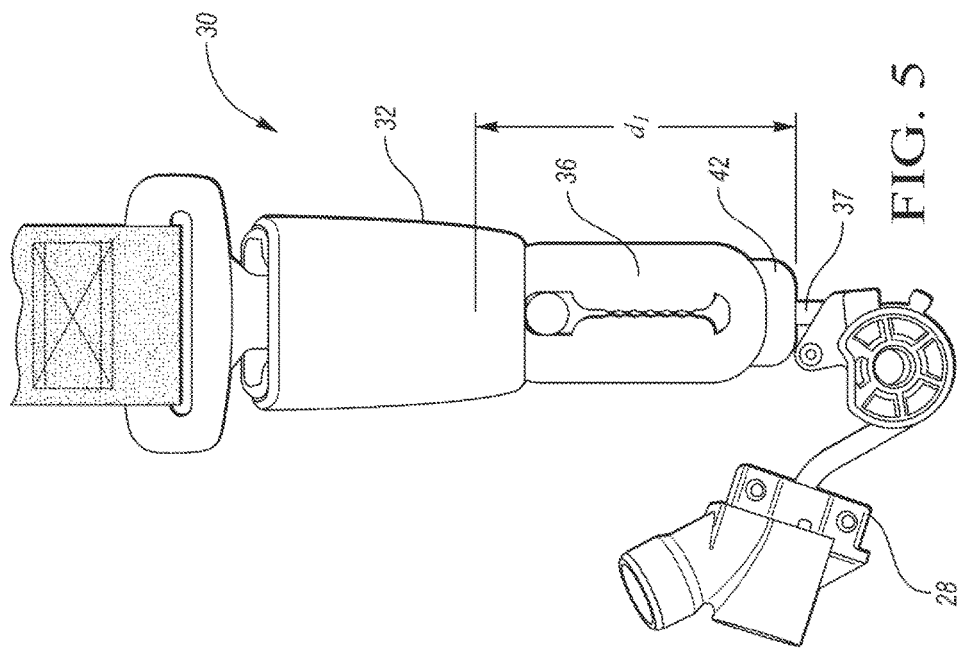
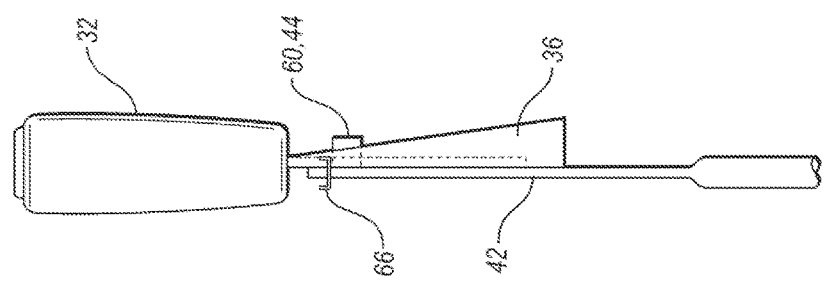
FIG. 5
FIG. 4

LOAD LIMITING SEAT BELT BUCKLE ASSEMBLIES

TECHNICAL FIELD

The disclosure relates to automotive seat belt buckle assemblies including a load limiting feature and a method of using the same.

BACKGROUND

An automotive vehicle is typically equipped with a variety of safety systems designed to protect an occupant during a crash event. One of the primary or passive safety systems includes a seat belt safety system which automatically activates during an impact event. The seat belt safety system may include a variety of features such as a retractor and a pretensioner in addition to a webbing designed to lay across a vehicle occupant's lap and across the occupant's chest. The seat belt safety system's purpose is to secure the occupant within the seat and within the vehicle cabin during a crash event, sudden acceleration, or deceleration.

SUMMARY

In at least one embodiment, a seat belt buckle assembly is disclosed. The assembly includes a buckle housing, a plate extending from the buckle housing and defining a slot, and a bracket including a rivet engaged in the slot. The plate and rivet are configured such that, in response to an impact force that exceeds a threshold acting to pull the buckle housing away from the bracket, the slot plastically deforms, permitting the buckle housing and plate to translate relative to the bracket. The slot may be V-shaped. The slot may define a plurality of serrated teeth. A thickness of the plate may increase along the slot. The bracket may be made from a first material and the plate may be made from a second material, the second material being less stiff than the first material. The assembly may further include a retractor pretensioner attached to the bracket via a cable. The assembly may also include a locking feature capable of preventing an upward movement of the bracket towards the buckle housing and the plate in response to the impact force. The distance the buckle housing and plate translate relative to the bracket may not exceed about 50 mm.

In another embodiment, a seat belt buckle assembly is disclosed. The assembly may include a buckle housing, a plate extending from the buckle housing and including a rivet, and a bracket defining a slot engaged with the rivet. The slot and rivet are configured such that, in response to an impact force that exceeds a threshold acting to pull the buckle housing away from the bracket, the slot plastically deforms, permitting the buckle housing and plate to translate relative to the bracket. The slot may be V-shaped. The slot may define a plurality of serrated teeth. The thickness of the bracket may increase along the slot. The bracket may be made from a first material and the plate may be made from a second material, the second material being stiffer than the first material. The assembly may further include a retractor pretensioner attached to the bracket via a cable. The assembly may include a locking feature capable of preventing an upward movement of the bracket towards the buckle housing and the plate in response to the impact force.

In yet another embodiment, a seat belt buckle assembly is disclosed. The assembly includes a buckle housing; a folded plate extending from the buckle housing; and a pretensioner retractor attached to the plate via a cable. The folded plate may be configured to unfold in response to an impact force that exceeds a threshold acting to pull the buckle housing away from the pretensioner. The folded plate may include one or more metallic folds. The one or more folds may be arranged in a zig-zag pattern. The one or more folds may be folded horizontally. At least some of the folds may have a different thickness.

BRIEF DESCRIPTION OF THE DRAWINGS

FIG. 4 depicts a side view of an exemplary seat belt buckle assembly;

FIGS. 5 shows a perspective view of the seat belt buckle assembly depicted in FIG. 2 in the post-pretensioner firing position;

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

A passenger vehicle is typically equipped with a number of safety features designed to protect the occupant of the vehicle during a collision or a sudden stop. One of the primary safety features in a vehicle is a seat belt system designed to secure the seat occupant against harmful movement that may result during a crash event, evasive maneuvering of the vehicle, or when the vehicle suddenly stops.

Figure 1:
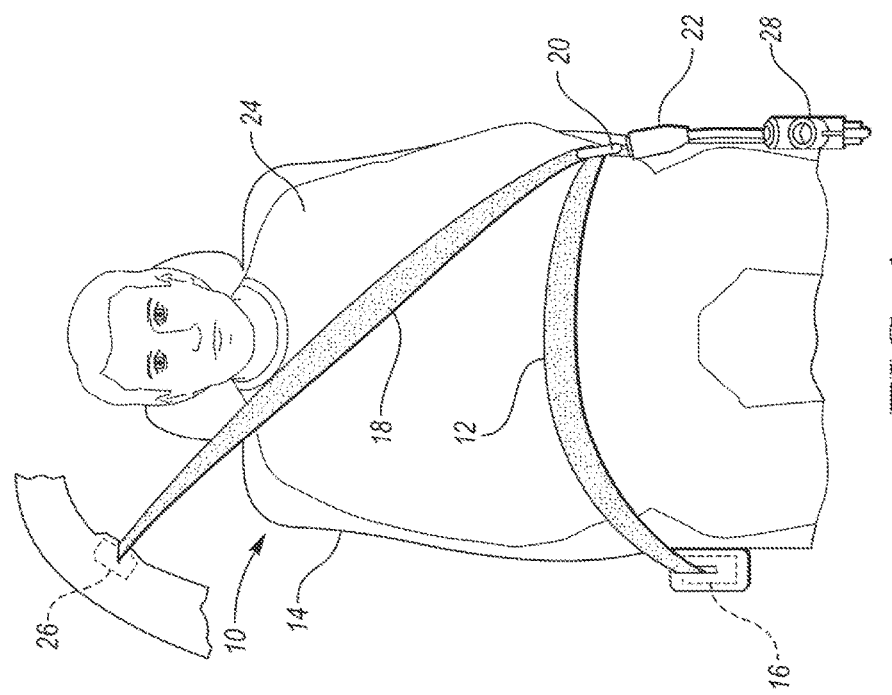
FIG. 1 depicts a schematic perspective view of a car seat and an associated 3-point seat belt system.

Numerous types of safety seat belt systems have been developed. Exemplary seat belt systems include a two-point seat belt system including a lap belt designed to be horizontally secured over the occupant's waist and a shoulder harness to be placed diagonally over the occupant's outboard shoulder and to be buckled inboard of the occupant's lap, a 3-point system, a 4-, 5-, 6-, and 7-point harness systems designed for child safety seats, racing cars, aerobatic aircrafts, etc. Automotive vehicles typically implement the 3-point system, an example of which is depicted in FIG. 1. The 3-point seat belt system 10 has a Y-shaped arrangement including a lap belt portion 12 anchored to the seat 14 with an end bracket 16. The lap portion 12 is connected to a shoulder harness 18 having a tongue 20 insertable into a seat belt buckle 22. In a collision, the 3-point seat belt 10 spreads out the energy of moving occupant's body 24 over the chest, pelvis, and shoulders. The forward movement of the occupant 24 during a crash event is thus slowed down and stopped, preventing potential injuries.

To increase their effectiveness, seat belt systems may be equipped with locking retractors 26. As FIG. 1 illustrates, the shoulder harness 18 is attached to a retractor 26. Retractors 26 are implemented to afford the seat occupant 24 some free movement of the upper body while limiting forward movement during a crash event. A retractor 26 is typically a spring-loaded reel including a locking mechanism that stops the seat belt 10 from extending off the reel during a sudden deceleration of a vehicle.

An additional feature of the seat belt system may be a tensioner or pretensioner 28 designed to tighten the seat belt 10 to prevent the occupant 24 from being thrust forward during a crash event. The pretensioner 28 is capable of tightening the seat belt 10 almost immediately during a crash event due to a variety of sensors (not depicted) in the car body which trigger the pretensioner 28. Several types of pretensioners 28 capable of repeated use have been developed, for example an electric or a mechanical pretensioner 28. Alternatively, a pyrotechnic pretensioner may operate only a single time or only for a period of time. An exemplary pretensioner 28 may include an explosive expanding gas to drive a piston that retracts the seat belt 10. As can be seen in FIG. 1, a pretensioner 28 may operate on the buckle 22 side of the seatbelt mechanism 10. Some electric pretensioners 28 are also designed to tighten the seat belt 10 during fast accelerations and sudden decelerations. A pretensioner 28 may be incorporated in the retractor system 26 to control the forward motion of the occupant 24 after the retractor reel goes into a locked position during a crash event.

Figure 2:
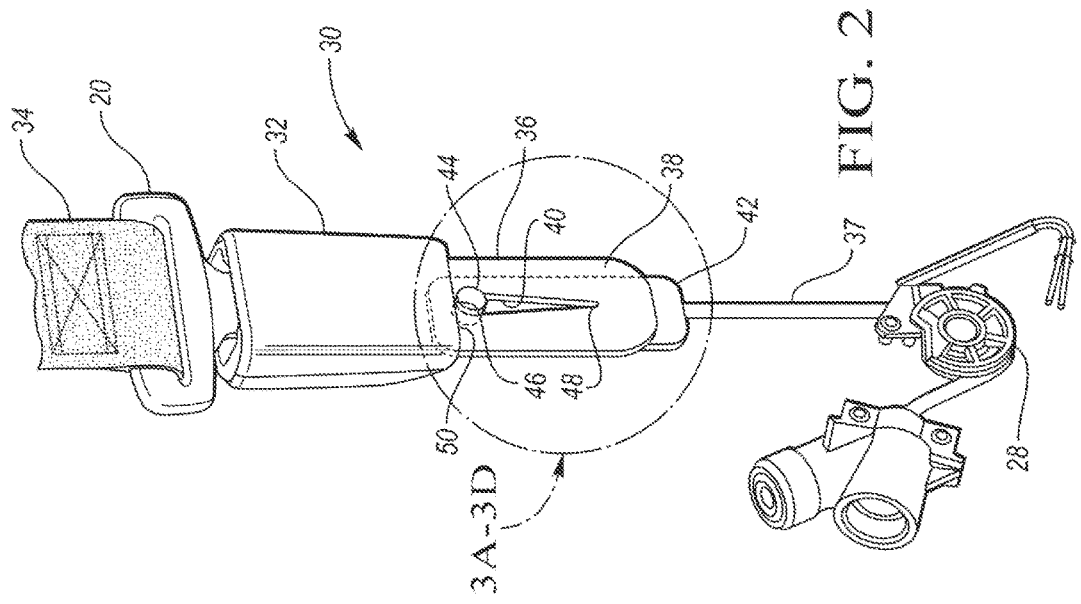
FIG. 2 depicts a perspective view of an exemplary seat belt buckle assembly having a plate and a bracket in the design position according to one or more embodiments.

In one or more embodiments, depicted in FIG. 2, a seat belt buckle assembly 30 of a 3-point seat belt system is disclosed. The assembly 30 includes a buckle housing 32 into which a tongue 20 connected to a seat belt webbing 34 may be secured. The buckle housing 32 includes a plate 36 extending from the buckle housing 32. The plate 36 extends toward a pretensioner 28 to which the plate 36 is connected via a pretensioner cable 37. The plate 36 has a body 38 and a slot 40 defined within its body 38. The assembly 30 further includes a bracket 42 having a rivet 44 engaged in the slot 40 of the plate 36. Under normal operating conditions of a vehicle, the rivet 44 stays engaged within the slot 40. But in response to an impact force that exceeds a threshold acting to pull the buckle housing 32 away from the bracket 42, the slot 40 plastically deforms, permitting the buckle housing 32 and the plate 36 to translate relative to the bracket 42. The assembly 30 thus functions as a load limiting management feature improving occupant chest performance during a crash event.

The body 38 of the plate 36 may have any shape, size, or configuration as long as the body 38 has a sufficient length to accommodate the slot 40. For example, the plate 36 may be generally rectangular, square, circular, elliptical, diamond-shaped, have a regular, irregular, symmetrical, or asymmetrical shape. The plate 36 may form an integral portion of the buckle housing 32. The slot 40 may likewise have any shape, size, or configuration, provided the slot 40 is capable of maintaining the rivet 44 secured within the slot 40 under normal operating conditions of a vehicle. The slot 40 may have any shape mentioned above or have a different shape. For example, as can be seen in FIG. 2, the slot 40 may be V-shaped or shaped like a triangle having a base 46 and the apex 48. The triangle may be an upside-down prototypical triangle with the base 46 running parallel to the base 50 of the buckle housing 32. The triangle may be an equilateral triangle, an isosceles triangle, acute-angled, or the like. Alternatively, the slot 40 may be shaped like an inverted letter A having at least one crossbar connecting opposing sides of the slot 40. The crossbar may be designed to be fractured by the rivet 44 as the plate 36 translates against the rivet 44.

Figure 3A:
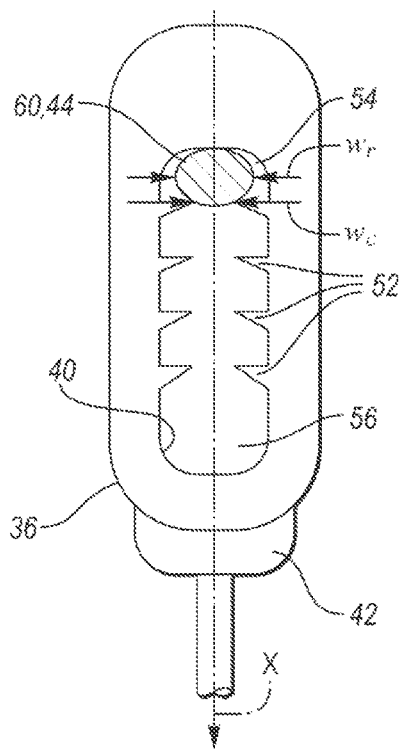
FIGS. 3A-3D show exemplary detailed views of the plate and the bracket depicted in FIG. 2.
Figure 3B:
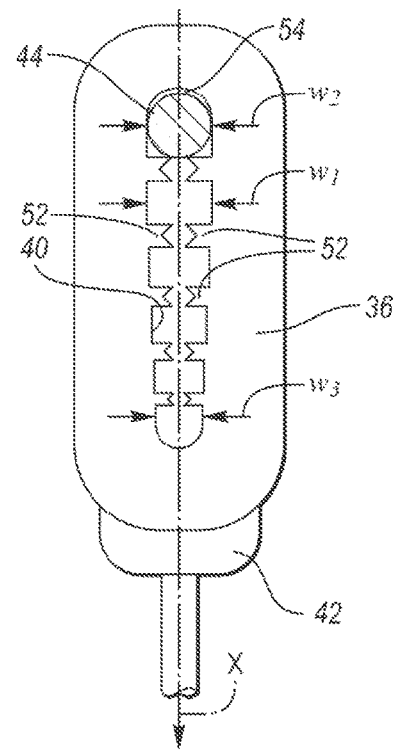

In alternative embodiments, the slot 40 may have a yet different shape. For example, as is illustrated in FIG. 3A, the slot 40 may be shaped like a rounded rectangle whose sides include a number of teeth 52 which the rivet 44 encounters and plastically deforms as the plate 36 translates relative to the bracket 42 during a crash event. The teeth 52 may be pointed towards the longitudinal axis x of the plate 36 in a variety of angles. The teeth may be distributed evenly, unevenly, randomly, regularly. The teeth 52 may be shaped like an isosceles, equilateral, acute-angled, right-angled, or obtuse-angled triangle. Alternatively, the teeth 52 may be split or bifurcated as is depicted in FIG. 3B. The teeth 52 may be indented, notched, scored, serrated, sawlike, smooth, symmetrical, asymmetrical, sharp, dull, rough, rounded, include protrusions, be pointed, the like, or a combination thereof.

Figure 3C:
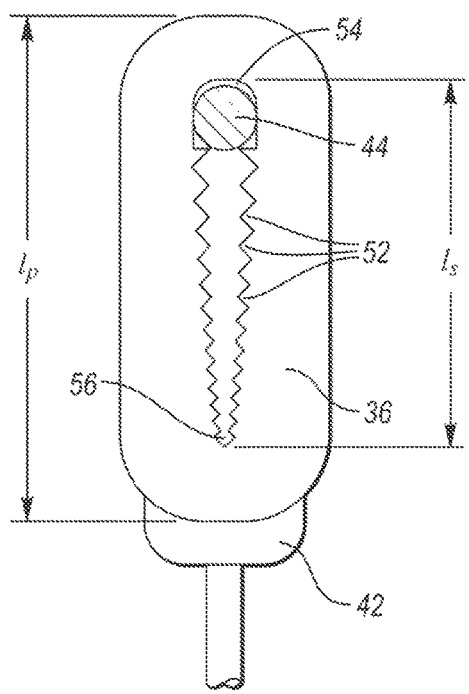
Figure 3D:
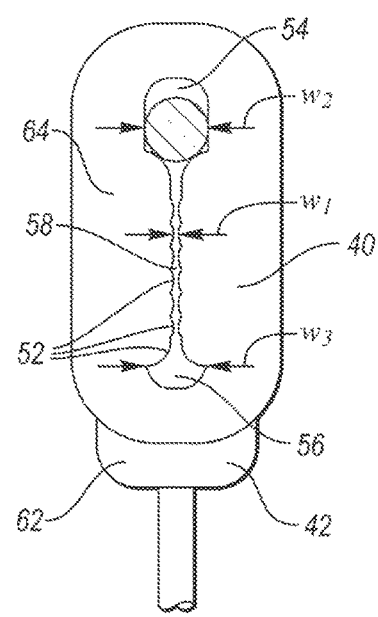

All the teeth 52 may have the same dimensions, orientation, and/or shape, and thus enable constant load limiting, as FIG. 3A illustrates. Alternatively, at least some of the teeth 52 may have a different shape, orientation, or at least one dimension than the remaining teeth 52, as is shown in FIGS. 3B-3D. The teeth 52 on the opposite sides of the slot 40 may be aligned or unaligned. The teeth 52 may be separated from each other in a random fashion or regularly. The teeth 52 have to extend far enough towards the longitudinal axis x of the plate 36 to ensure that the rivet 44 comes in contact with at least a portion of each tooth 52 as the plate 36 translates relative to the rivet 44. In some embodiments, the dimensions of the teeth 52 are designed such as that the teeth's length, height, width, and/or thickness progressively increases towards the bottom portion 56 of the slot 40. Such arrangement provides progressive load limiting as the amount of force required for the translation of the plate 36 relative to the bracket 42 progressively increases. The arrangement may help increase the amount of energy to be absorbed by the assembly 30 in response to the impact force as the plate's translation against the rivet 44 is made progressively more difficult.

In FIG. 3C, an alternative shape of the slot 40 is disclosed. The slot 40 is shaped like a triangle including a number of teeth 52. Just as in FIG. 3A, the rivet 44 is located in the top portion 54 of the slot 40. A top pair of teeth 52 prevents the rivet 44 from translating downward towards the bottom portion 56 of the slot 40 during normal operating conditions of the vehicle. The opposing teeth 52 are aligned along the entire length $l_s$ of the slot 40. But in a yet alternative embodiment, a portion of the opposing teeth 52 may be purposely misaligned in at least a portion of the slot 40, for example in the bottom portion 56 of the slot 40.

FIG. 3D depicts another embodiment of the slot 40 with teeth 52. As can be seen in FIG. 3D, the rivet 44 is located in the top portion 54 of the slot 40. The dimensions of the very top and the very bottom pair of teeth 52 are different that dimensions of the remaining teeth 52. The distance between the opposing sides of the slot 40 differs throughout different portions of the slot 40. The distance between the opposing sides of the slot 40 defines a channel 58 having a width $w_1$. $W_1$ may be smaller than a width in the top portion 54 $w_2$, the bottom portion 56 $w_3$, or both, as is depicted in FIG. 3D. Alternatively, the width $w_1$ may be the same as width $w_2$, width $w_3$, or both, in at least a portion of the channel 58.

The length $l_s$ of the slot 40 is smaller than the length of the plate $l_p$, as can be seen in FIG. 3C. The length $l_s$ may be about ¼, ½, ⅓, ⅔ of the length $l_p$. The length $l_s$ may be about 20%, 30%, 40%, 50%, 60%, 70%, 80%, 90% or more of the length $l_p$.

The bottom portion 56 may form a substantial portion of the slot 40, as can be seen in FIG. 3A. Alternatively, the bottom portion 56 may form the smallest portion of the slot 40, as is shown in FIG. 3C. The shape of the top portion 54, the bottom portion 56, or both may vary. For example, the top portion 54, the bottom portion 56, or both may be shaped like a semicircle, a circle, a rectangle, a square, a polygon, a triangle, be regular or irregular, symmetrical or asymmetrical, or the like.

The bracket 42 includes at least one rivet 44 engaged within the slot 40 of the plate 36. The bracket 42 may have any shape, size, and configuration as long as the bracket includes a rivet 44 capable of deforming the sides of the slot 40 of the plate 36 during a crash event. As can be seen in FIGS. 3A-3D, the rivet 44 includes a head 60 which has a width $w_r$. The width $w_r$ has to be larger than a width $w_c$ of the channel 58 so that the rivet 44 is prevented from translating towards the bottom portion 56 of the slot 40. The rivet 44 thus helps to secure the bracket 42 in place. The head 60 may have any shape such as a circular, semi-circular, square, diamond, rectangular, oval, symmetrical, asymmetrical, regular, irregular, or the like. The rivet 44 may be alternatively a bar, a nut, a peg, a pin, a rod, a screw, a spike, a stud, a bolt, a fastener, a nail.

In at least one embodiment, the bracket 42 may include two or more rivets 44 of varying sizes. For example, a first rivet 44 having a first diameter may be situated closest to the bottom portion 56 of the slot 40 while a second rivet 44 having a second diameter which is larger than the first diameter may be situated in the top portion 54 of the slot 40. In response to the impact force, the slot 40 is being pushed against the first rivet 44 having the smaller diameter and partially deforms before being pushed against the second rivet 44 having the larger diameter so that the slot 40 deforms further.

The plate 36 may feature additional properties assisting with the load liming management of the assembly 30. For example, the plate 36 may be made in such a way that the plate 36 becomes progressively thicker towards the bottom portion 56 of the slot 40. Such embodiment showing a plate 36, thickness of which increases along the slot 40, can be seen in FIG. 4. Translation of the plate 36 against the rivet 44 in such an embodiment becomes progressively difficult due to the increasing thickness of the material the plate 36 is made from. In yet another embodiment, the entire load limiting management feature may be based on differing thickness of the plate 36 as opposed to a specific shape or serrated features of the slot 40.

The plate 36, the bracket 42, or both may be made from metal such as various grades of steel or metal alloys with the base element including, but not limited to, iron or titanium. The alloying elements may include, but are not limited to, carbon, copper, silicon, zinc, manganese, magnesium, iron, chromium, scandium, rhodium, lead, nickel, cobalt, lithium, plutonium, potassium, tin, zirconium, the like, or a combination thereof. Alternatively, at least one of the plate 36 and the bracket 42 may be made from a non-metallic hard material such as a thermoset polymeric material or a composite material having a relatively high strength and low brittleness. For example, the material may be a composite material having a matrix from a thermoset polymer such as an epoxy resin, polydicyclopentadiene, polyamide, polyimide, etc. reinforced with fibers such as glass, Kevlar, carbon, polyethylene, etc. Other materials are contemplated.

The rivet 44 may be made from a different material than at least one remaining portion of the bracket 42. The rivet 44, the bracket 42, or both may be made from a material having higher strength, stiffness, ductility, malleability enabling plastic deformation, ability to withstand tensile and compressive stresses, or a combination thereof than the material the plate 36 is made from. FIG. 3D illustrates the bracket 42 being made from a first material 62 and the plate 36 being made from a second material 64, the second material 64 being less stiff than the first material 62. The plate 36 may be made from more than one type of material. For example, a portion of the plate 36 in close proximity of the slot 40 may be made from a material having higher strength, stiffness, ductility, malleability, resistance to tensile and compressive stresses, or a combination thereof than the material of the remaining portions of the plate 36. The material properties of the metals, polymers, etc. used to produce the plate 36, the bracket 42, the rivet 44, or a combination thereof may improve the load limiting management of the assembly 30, as was described above.

The assembly 30 may further include a locking feature 66 capable of preventing an unwanted movement of the bracket 42 towards the buckle housing 32 and/or the plate 36, rotation, or another translation of the bracket 42 during the normal operating conditions of a vehicle. The locking feature 66 may be designed to disengage in response to the impact force and thus enable movement of the plate 36 relative to the bracket 42. The locking feature 66 may be anything capable of fulfilling this function. For example, the locking feature 66 may be an adhesive, staples, stitching, or another relatively weak connection between the bracket 42 and the plate 36, the buckle housing 32, or both. Alternatively, the bracket 42 may be attached to another portion of the vehicle ensuring that the bracket 42 is engaged within the slot 40. An exemplary locking feature 66 is depicted in FIG. 4.

As was stated above, during the normal operating conditions of the vehicle, the rivet 44 of the bracket 42 remains engaged within the top portion 54 of the slot 40 and the assembly 30 is in its design position, also called the pre-pretensioner firing position. The assembly 30 in the design position is depicted in FIG. 2.

In response to an impact force that exceeds a threshold amount; however, the retractor pretensioner 28 is activated via signals received from at least one sensor (not depicted). Consequently, the retractor 26 locks the pretensioner cable 37, for example using a mechanism allowing movement in one direction only, and a locking tongue is locked in the buckle housing 32, preventing forward movement of occupant 24. Approximately 5 ms from the time the retractor pretensioner 28 is activated, the pretensioner cable 37 pulls the seat belt buckle assembly 30 towards the pretensioner 28, and locks the pretensioner cable 37 when the assembly 30 reaches a predetermined position, as can be seen in FIG. 5. The predetermined position is also called a post-pretensioner firing position. The distance $d_1$ between the pre-pretensioner firing position and the post-pretensioner firing position is at most about 80 mm. The distance $d_1$ may be customized by adjusting the design position, by varying location of the pretensioner 28, or otherwise, such that the distance $d_1$ may be about 20-150 mm, 50 to 100 mm, or 70 to 90 mm.

After the pretensioner cable 37 locks, the portions of the assembly 30 which are not secured to the pretensioner cable 37 start moving toward the occupant 24. The bracket 42 cannot move towards the occupant 24 because the bracket 42 is secured to the locked pretensioner cable 37. The plate 36 and the buckle housing 32, on the other hand, are not attached to the pretensioner cable 37 and start moving towards the occupant 24 due to the impact forces present during a crash event. Yet, the movement of the buckle housing 32 with the coupled plate 36 is slowed down due to the presence of the rivet 44 which is engaged in the top portion 54 of the slot 40. To move away from the pretensioner 28, the plate's slot 40 is forced against the rivet 44 until the rivet 44 reaches the post-load limiting position, that is until the rivet 44 reaches the bottom portion 56 of the slot 40 or until the acting forces are insufficient to move the slot 40 against the rivet 44. As is shown in FIG. 6, when the plate 36 translates relative to the bracket 42, the sides of the slot 40 and/or the rivet 44 are being plastically deformed.

Figure 6:
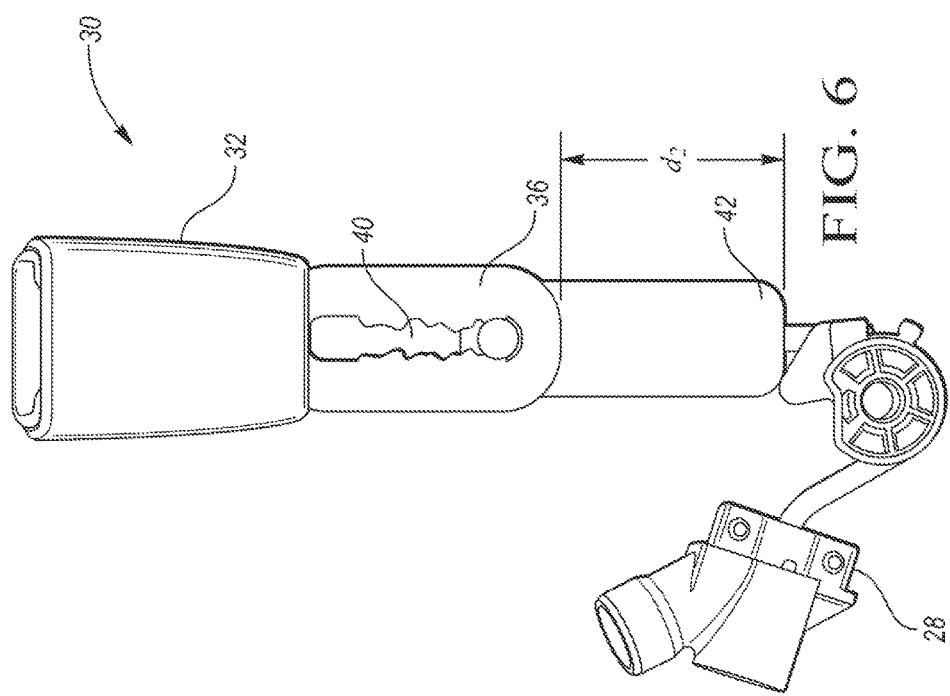
FIGS. 6 shows a perspective view of the seat belt buckle assembly depicted in FIG. 5 in the post-load limiting position.

As FIG. 6 further illustrates, the assembly 30 can move a maximum distance $d_2$ of 50 mm towards the occupant 24 from the post-pretensioner firing position to the post-load limiting position. The distance $d_2$ may be adjusted by increasing or decreasing the length of the plate 36, the slot 40, or both, or otherwise, such that the distance $d_2$ may be about 10-100 mm, 20 to 80 mm, or 40 to 60 mm. When the plate 36 reaches the maximum distance it can travel from the post-pretensioner firing position, and $d_1$ is about 80 mm, and $d_2$ is about 50 mm, the assembly 30 is about 30 mm below its design position. Thus, the occupant 24 has been prevented from being thrust forward during the impact, yet was also afforded sufficient room to reduce an injury to the upper and lower portion of the occupant's chest. Additionally, because the buckle housing 32 is about 30 mm below its design position, submarining of the occupant 24 during the crash event is also prevented. The various load limiting features named above such as the serrated teeth 52 or varying thickness of the plate 36, may be designed to meet a particular load limiting target.

Figure 7:
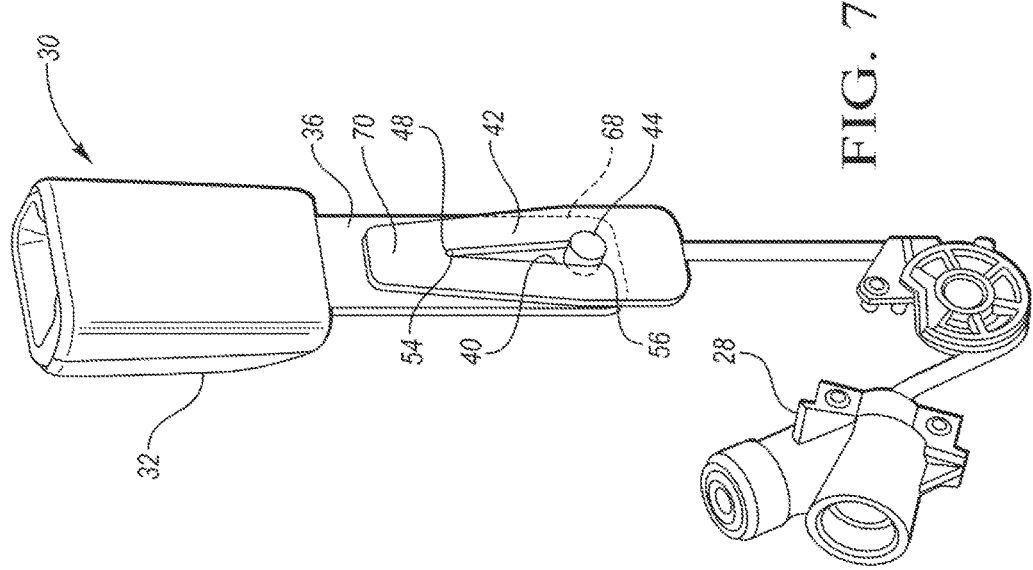
FIGS. 7 depicts a perspective view of an alternative embodiment of the seat belt buckle assembly.

In an alternative embodiment, shown in FIG. 7, the design of the plate 36 and the bracket 42 is reversed such that the plate 36 includes the rivet 44 and the bracket 42 includes the slot 40. In this embodiment, the bracket 42 is attached to the pretensioner cable 37 in the same manner as in the previously described embodiments. The slot 40 formed within the bracket 42 may be shaped like a prototypical triangle with the base of the triangle 46 being located in the bottom portion 56 of the slot 40 and the apex 48 pointing toward the buckle housing 32. The rivet 44 may be located in the lower portion 68 of the plate 36. While the plate 36 is secured to the buckle housing 32 or forms an integral portion of the buckle housing 32 as was described in the embodiments above, the bracket's upper portion 70 may be temporarily attached to the plate 36 or another portion of a vehicle so that the bracket 42 does not move in its design position. The description of the bracket 42, plate 36, slot 40, and rivet 44 above also applies to this embodiment.

Figure 8B:
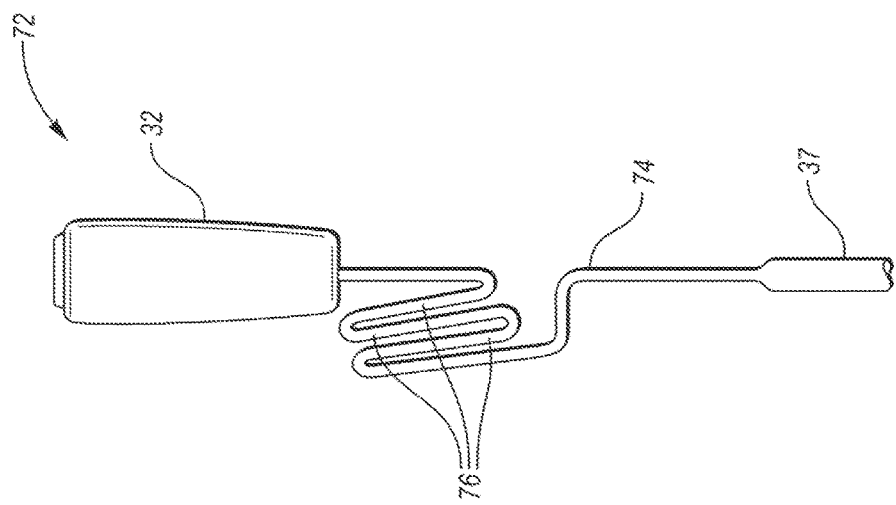
FIG. 8B shows a side view of the seat belt buckle assembly of FIG. 8A.
Figure 8A:
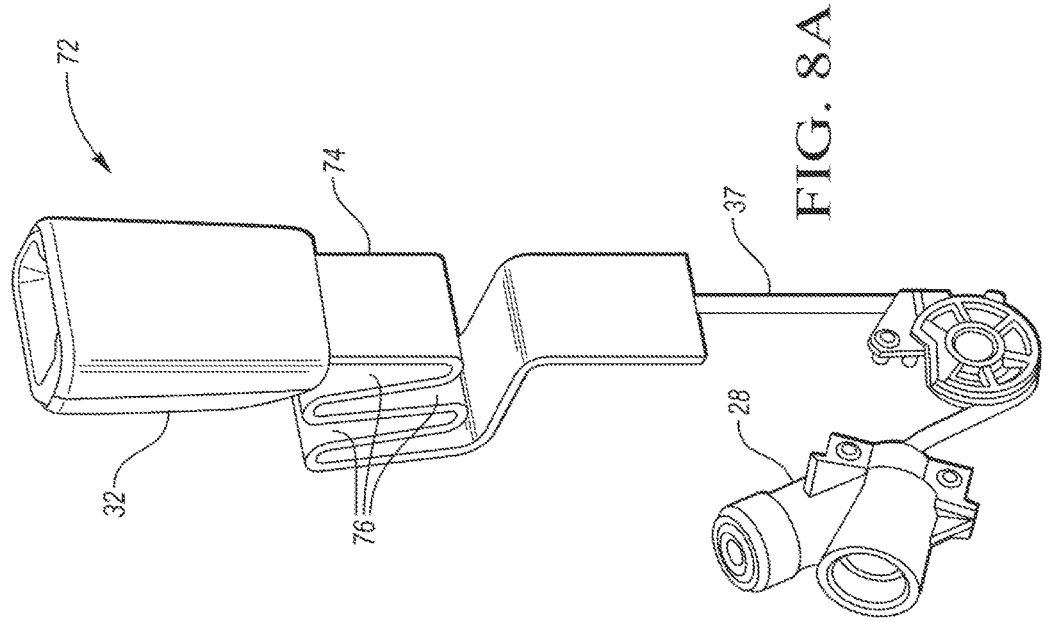
FIG. 8A depicts a yet another embodiment of the seat belt buckle assembly having a folded plate in the design position in a perspective view.
Figure 8D:
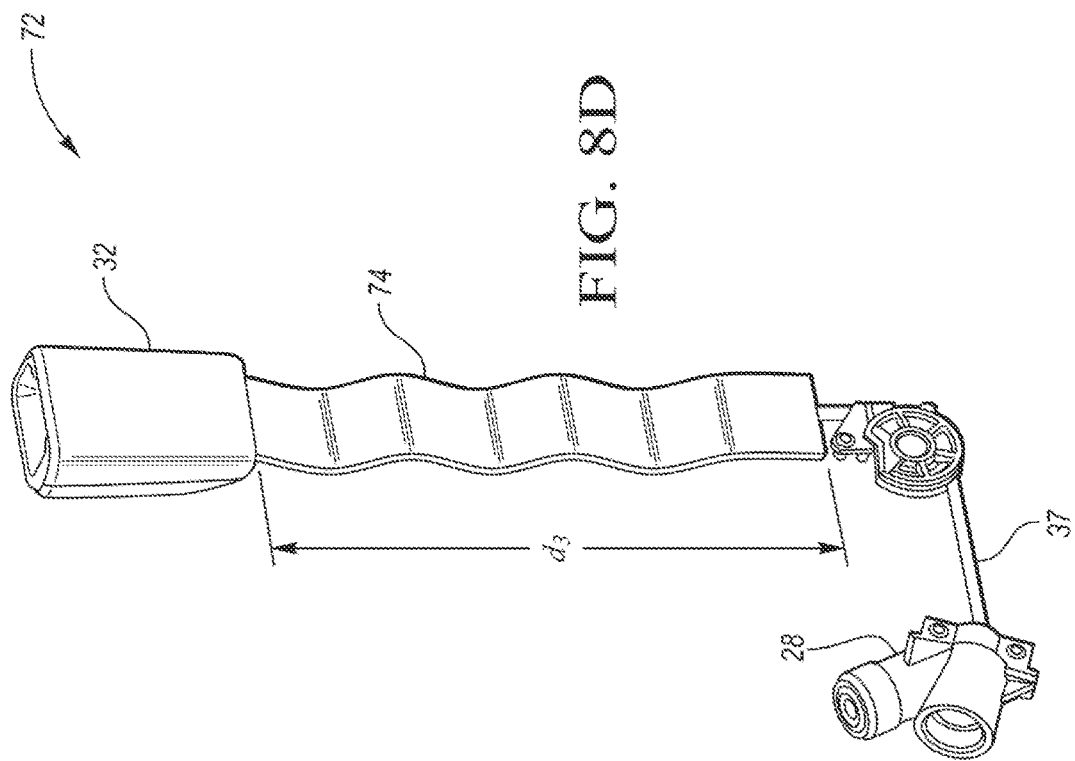
FIG. 8D shows the seat belt buckle assembly of FIG. 8A in a post-load limiting position.

In yet another embodiment, depicted in FIGS. 8A-8D, a different type of a load limiting feature is implemented as part of a seat belt buckle assembly 72. The assembly 72 includes a seat belt buckle housing 32 attached to a plate 74 having a number of folds 76. The folded plate 74 extends towards the pretensioner 28 and is secured to the pretensioner 28 via a pretensioner cable 37. During normal operating conditions of a vehicle, the folds 76 remain folded and the assembly 72 remains in its design position or pre-pretensioner firing position, as is depicted in FIGS. 8A and 8B.

Figure 8C:
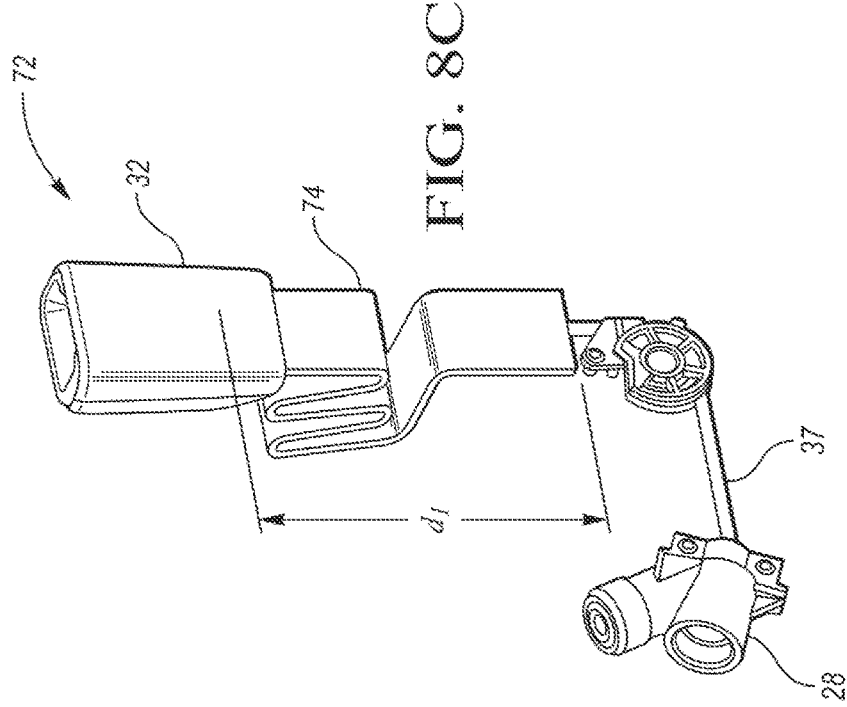
FIG. 8C shows the seat belt buckle assembly of FIG. 8A in a post-pretensioner firing position.

In response to an impact force that exceeds a threshold amount; the retractor pretensioner 28 is activated via signals received from at least one sensor (not depicted), the retractor 26 locks, and a locking tongue is locked in the buckle housing 32, preventing forward movement of the occupant 24, just as in the embodiments described above. Approximately 5 ms from the time the retractor pretensioner 28 is activated, the pretensioner cable 37 pulls the seat belt buckle assembly 72 towards the pretensioner 28, and locks the pretensioner cable 37 when the assembly 30 reaches a predetermined post-pretensioner firing position, as can be seen in FIG. 8C. The distance $d_1$ between the pre-pretensioner firing position and the post-pretensioner firing position may be at most about 80 mm. The distance $d_1$ may be customized, as mentioned above, such that the distance $d_1$ may be about 20-150 mm, 50 to 100 mm, or 70 to 90 mm.

After the pretensioner cable 37 locks, the buckle housing 32 starts moving toward the occupant 24 due to the impact forces present during the crash event. As the buckle housing 32 moves away from the pretensioner 28, the folds 76 of the plate 74 begin to unfold, straighten, and act as a load limiting management feature. The maximum distance $d_3$ the folds 76 are capable of extending is about 75 mm. The distance $d_3$ may be adjusted based on the requirements of a specific application by increasing or decreasing the length of the folded plate 36 to achieve a desired positioning of the assembly 72 relative to the occupant 24 during a crash event. For example, the distance $d_3$ may be about 10 to 150 mm, 30 to 100 mm, or 50 to 80 mm. Therefore, when the distance $d_1$ is about 80 mm and $d_3$ is about 75 mm, and when the folded plate 74 is fully unfolded, the assembly 72 may be about 5 mm below the designer position.

Figure 10:
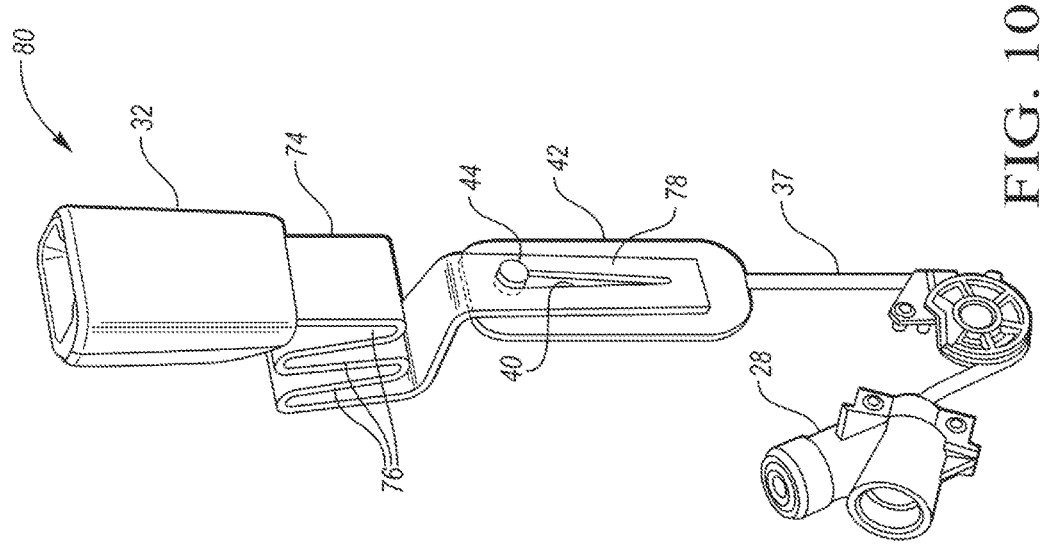
FIG. 10 depicts a perspective view of another embodiment of the seat belt buckle assembly having two different load limiting management features.
Figure 9:
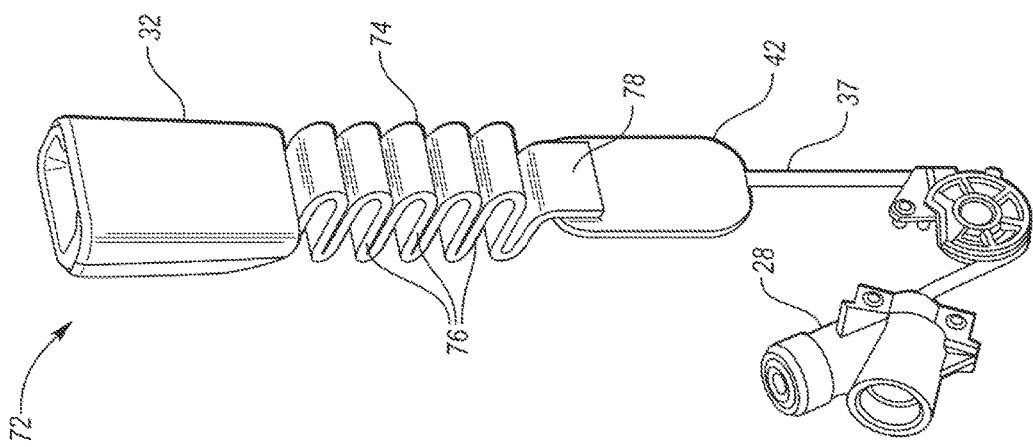
FIG. 9 illustrates a side view of another embodiment of the seat belt buckle assembly having a folded plate and a bracket.

While the assembly 72 depicted in FIGS. 8A-8D does not include a bracket 42 attached to the lower portion 78 of the folded plate 74, a bracket 42 may be included, as is illustrated in FIG. 9. Additionally still, an embodiment having two load limiting features is contemplated. In such an embodiment showing a seat belt buckle assembly 80, depicted in FIG. 10, the bracket 42 may include a rivet 44 and a slot 40 the rivet 44 is engaged in may be formed in the lower portion 78 of the folded plate 74. Alternatively, the bracket 42 may include a slot 40 engaging a rivet 44, the rivet 44 being integrated in the lower portion of the folded plate 74. In these embodiments, after the pretensioner cable 37 locks and the assembly is in its post-pretensioner firing position, the buckle housing 32 starts moving toward the occupant 24 due to the impact forces present during the crash event. As the buckle housing 32 moves away from the pretensioner 28, the folded plate 74 begins to unfold, straighten, and act as the load limiting feature. At the same time or after the folded plate 74 is at least partially extended, the slot 40 is forced against the rivet 44 such that the slot 40, the rivet 44, or both plastically deform. Dimensions of both load-limiting features have to be set to achieve a desired positioning of the entire assembly 80 in the post-load limiting position relative to the occupant during an impact.

The folds 76 of the folded plate 74 may be folded in a regular or irregular manner. The folded plate 74 may include one or more folds 76. For example, the folded plate 74 may include about 1-20 or more folds, 4-18 fold, or 8-12 folds. All the folds 76 may have the same size, shape, configuration, thickness, or orientation. Alternatively, at least some of the folds 76 may differ from the remaining folds 76 by their size, shape, configuration, thickness, or orientation. The folds 76 may be folded in a horizontal or vertical manner. The folds 76 may be shaped like a single half fold or the letter V, an accordion fold or the letter Z also called the zig-zag fold, an engineering fold, gate fold, or the like. The folded plate 74 may features more than one kind of fold.

To prevent an unwanted movement or unfolding of the folds 76, at least one locking feature 66 may be added in between at least some of the folds 76. Alternatively, at least some of the folds 76 or all folds 76 may be secured together with the locking feature 66. The locking feature 66 may be an adhesive bonding, peel off bonding, staples, stamping, stitching, or the like. A locking feature 66 may also secure the folds 76 to another portion of the assembly or another portion of the vehicle.

The material the folded plate 74 is made from may be customized based on the desired results of a specific application. For example, the folds 76 may be made from metal such as various grades of steel, an alloyed metal described above, or another high strength material which will not yield during normal operating conditions of the vehicle, but which will be sufficiently malleable during an impact. An alternative material for the plate 74 may be various types of high strength polymeric materials having sufficient capability to stretch without braking.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. A seat belt buckle comprising:
   a buckle housing;
   a plate, defining a slot, extending from the housing, the plate's thickness increasing along the slot; and
   a bracket including a rivet engaged in the slot,
   wherein the plate and rivet are configured such that, in response to an impact force exceeding a threshold acting to pull the housing away from the bracket, the slot plastically deforms, permitting the housing and plate to translate relative to the bracket.

2. The assembly of claim 1, wherein the slot is V-shaped.

3. The assembly of claim 1, wherein the slot defines a plurality of serrated teeth.

4. The assembly of claim 1, wherein the bracket is made from a first material and the plate is made from a second material, the second material being less stiff than the first material.

5. The assembly of claim 1, further comprising a retractor pretensioner attached to the bracket via a cable.

6. The assembly of claim 1, further comprising a locking feature configured to prevent an upward movement of the bracket towards the buckle housing and the plate in response to the impact force.

7. The assembly of claim 1, wherein a distance the buckle housing and the plate translate relative to the bracket does not exceed about 50 mm.

8. A seat belt buckle assembly comprising:
   a buckle housing;
   a plate extending from the buckle housing and defining a V-shaped slot, a thickness of the plate increasing along the slot; and
   a bracket including a rivet engaged in the slot,
   wherein the plate and rivet are configured such that, in response to an impact force that exceeds a threshold acting to pull the buckle housing away from the bracket, the slot plastically deforms, permitting the buckle housing and plate to translate relative to the bracket.

9. The assembly of claim 8, wherein the slot defines a plurality of serrated teeth.

10. The assembly of claim 8, wherein the bracket is made from a first material and the plate is made from a second material, the second material being less stiff than the first material.

11. The assembly of claim 8, further comprising a retractor pretensioner attached to the bracket via a cable.

12. The assembly of claim 8, further comprising a locking feature configured to prevent an upward movement of the bracket towards the buckle housing and the plate in response to the impact force.

13. The assembly of claim 8, wherein a distance the buckle housing and the plate translate relative to the bracket does not exceed about 50 mm.

* * * * *